United States Patent
Bina et al.

(10) Patent No.: US 7,163,329 B2
(45) Date of Patent: Jan. 16, 2007

(54) ADJUSTABLE LIGHT PIPE FIXTURE

(75) Inventors: Dave Bina, Northfield Center, OH (US); John M. Davenport, Middleburg Heights, OH (US); Roger F. Buelow, II, Gates Mills, OH (US); Gregory P. Frankiewicz, Mayfield Heights, OH (US)

(73) Assignee: Fiberstars, Inc., Solon, OH (US)

( * ) Notice: Subject to any disclaimer, the term of this patent is extended or adjusted under 35 U.S.C. 154(b) by 214 days.

(21) Appl. No.: 10/793,049

(22) Filed: Mar. 4, 2004

(65) Prior Publication Data

US 2004/0196666 A1    Oct. 7, 2004

Related U.S. Application Data

(60) Provisional application No. 60/452,806, filed on Mar. 7, 2003.

(51) Int. Cl.
*E04D 13/00*    (2006.01)

(52) U.S. Cl. .................. 362/576; 362/147; 362/551

(58) Field of Classification Search ............. 362/147, 362/551, 552, 576, 581; 385/31, 39, 88–89, 385/901
See application file for complete search history.

(56) References Cited

U.S. PATENT DOCUMENTS

| | | | | |
|---|---|---|---|---|
| 2,033,699 A | * | 3/1936 | Frech | 362/519 |
| 2,219,770 A | * | 10/1940 | Mead et al. | 439/271 |
| 5,029,973 A | * | 7/1991 | Rink | 385/60 |
| 5,303,125 A | * | 4/1994 | Miller | 362/554 |
| 5,384,881 A | * | 1/1995 | Miller | 385/115 |
| 5,907,648 A | * | 5/1999 | Miller et al. | 385/33 |
| 6,200,011 B1 | * | 3/2001 | Miller et al. | 362/554 |
| 6,234,640 B1 | * | 5/2001 | Belfer | 362/551 |
| 6,523,984 B1 | * | 2/2003 | Belfer | 362/551 |

* cited by examiner

*Primary Examiner*—Thomas M. Sember
*Assistant Examiner*—Adam C. Rehm
(74) *Attorney, Agent, or Firm*—Charles E. Bruzga; Bruzga & Associates

(57) ABSTRACT

A light pipe fixture with adjustable beam spreads comprises a bayonet assembly having a generally tubular coupling for receiving a light-dispensing end of a light pipe, and a receiver assembly. The receiver assembly has a generally tubular coupling for receiving therewithin the bayonet assembly coupling at adjustable levels of penetration of the bayonet assembly coupling within the receiver assembly coupling. The receiver assembly further comprises an optical lens and a hollow portion for focusing a light beam from the end of the light pipe through the lens. The radial interior surface of the receiver assembly coupling and the radial exterior surface of the bayonet assembly coupling may be configured so the receiver assembly coupling slidably and lockingly receives the bayonet assembly coupling in any of a plurality of positions along the length of the receiver assembly coupling.

36 Claims, 18 Drawing Sheets

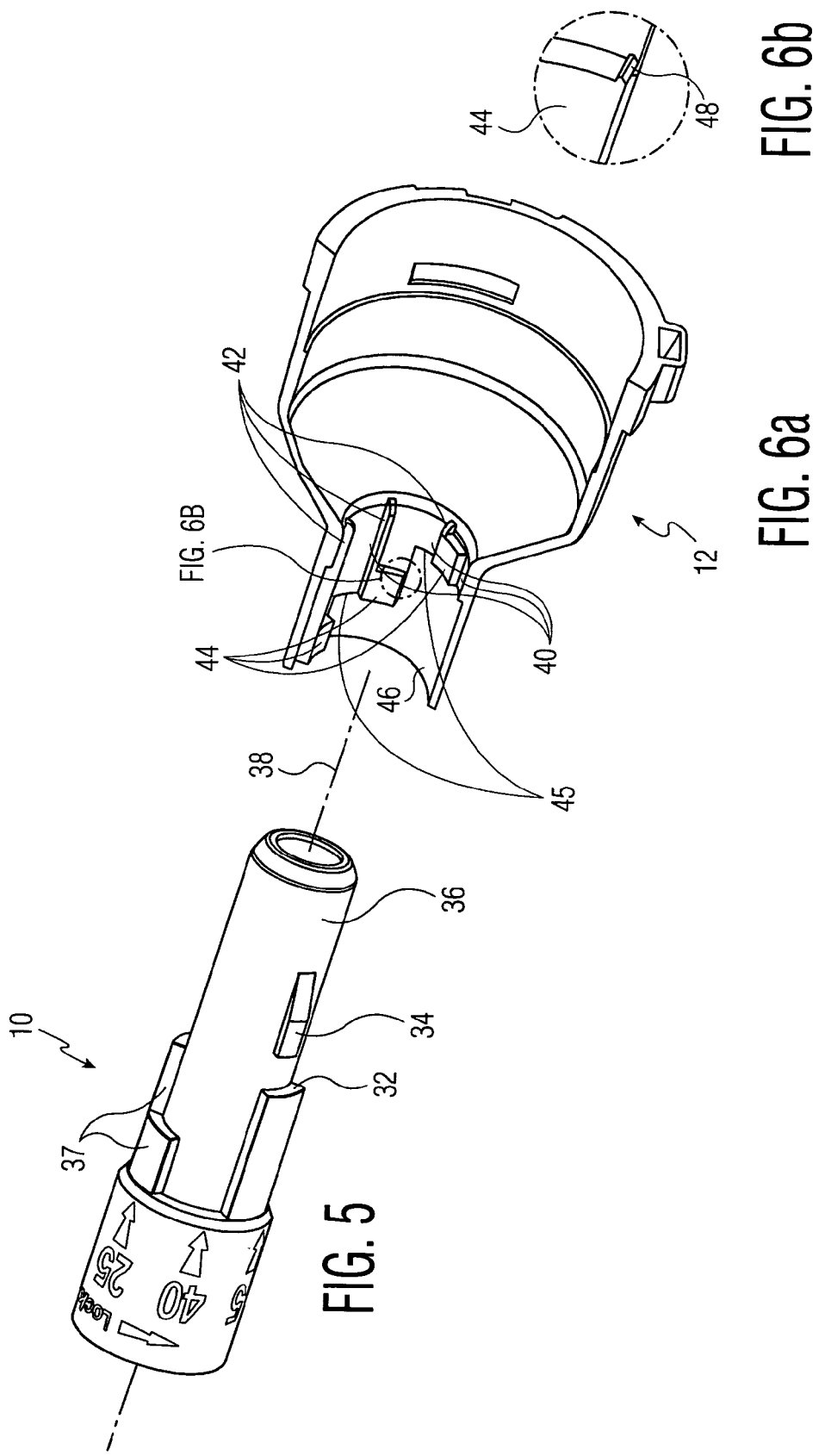

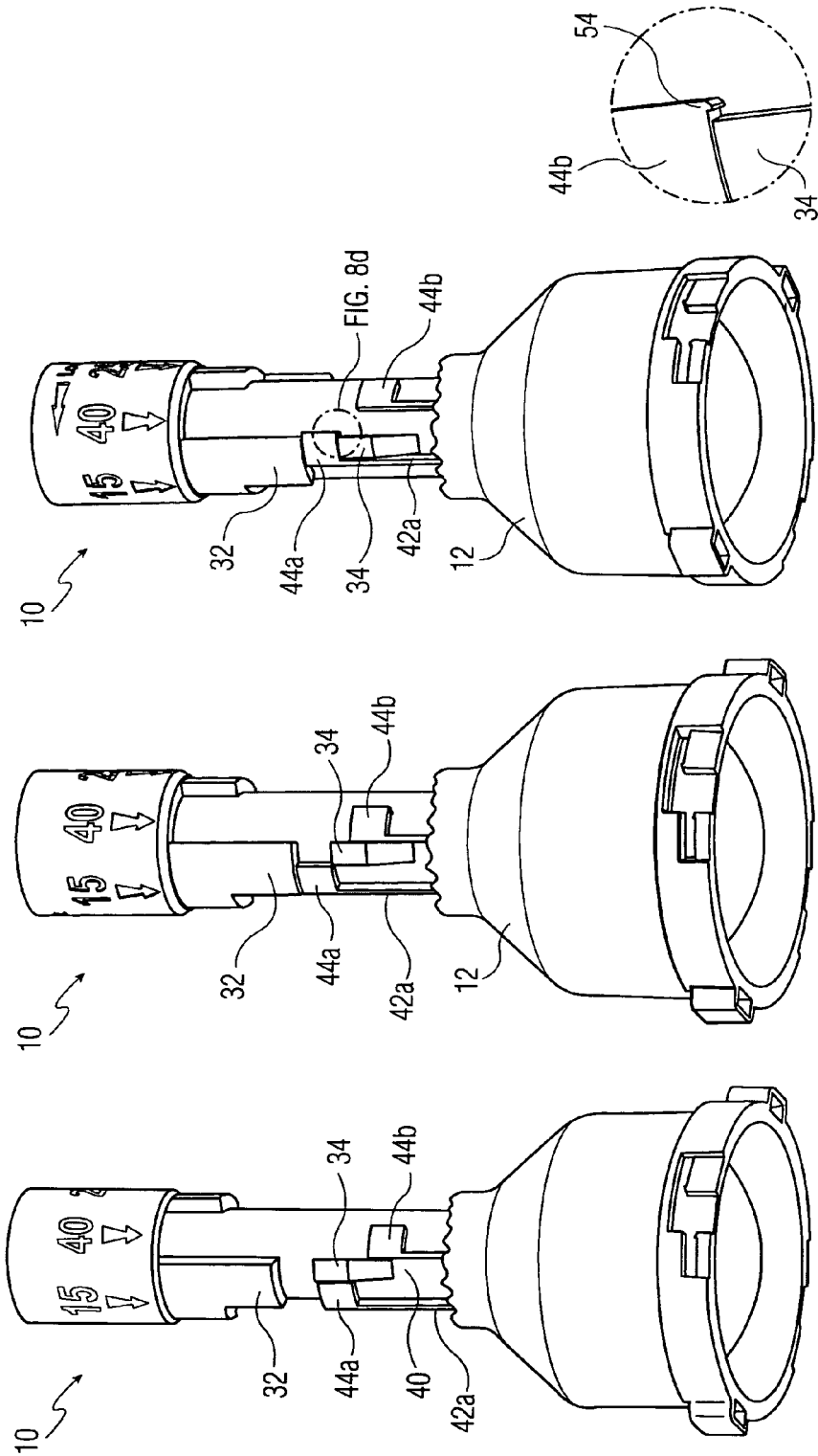

ADJUSTABLE LIGHT PIPE FIXTURE

This application claims priority from U.S. Provisional Application No. 60/452,806 filed on Mar. 7, 2003.

FIELD OF THE INVENTION

The present invention relates to fixtures for a light pipe with various features for conveniently installing the fixtures in a ceiling, for instance.

BACKGROUND OF THE INVENTION

In the general- and accent-lighting applications, customers often require flexibility in the angular distribution of the light. This flexibility is sometimes related to the lighting being used in a space that has changing requirements. An example is a retail space where different products are displayed in different ways each week. In this retail space example, spot lights may be desirable for small items, and wider beam flood lights might be appropriate for larger items.

Another common situation is where a lighting designer or architect will place light points within a space before the final furniture or decoration design is set. The furniture and decoration become targets for the lighting to illuminate once they are set in place, and they may require specific light beam spreads to achieve desirable lighting.

The lighting consumer has several options to install adjustable light today. For very large fixtures used in factories or warehouses, there are often one or two settings for a socket within a large reflector. By moving the socket, a customer can change the beam spread to a few different settings, but this is rarely done because of the difficulty involved. Instead, the fixtures are usually set in the factory and never changed.

A second option available today is to use lamps with integral reflectors that have different beam spreads. One example of this is low voltage halogen lamps, of which MR-16 is a common type. The MR-16 lamps are available in several light beam spreads from very narrow spot lights (with angular extents of about 7 degrees) to very wide flood lights (with angular extents of about 60 degrees). The most common beam spreads for the accent-lighting applications where MR-16s are used are 15, 25 and 40 degrees. This strategy causes complications when lamps are changed after burning out. All MR-16s are very similar in appearance, and beam patterns within a space are only maintained after re-lamping if the exact same lamp is used to replace the burned out lamp. This strategy also requires many different lamp types to be kept on hand.

Fiber optic lighting has historically offered an easier option for adjusting beam spread. Because fiber optic lighting delivers lighting in a forward direction of usually less than about one steradian, it can easily be controlled with imaging or non imaging lenses. By moving the fiber output face with relation to the beam forming lens, different beam spreads can be achieved. Fiber optic lighting fixtures exist today which allow infinite adjustment of the distance from the lens to the fiber. Sometimes these fixtures will have visual guides to help the installer guide the beam setting to the desired angular setting. Because there is infinite adjustment, and only a visual guide to beam setting, in any field of fixtures that are desired to be at the same beam angle, significant variation will be observed. So, the beam-angle accuracy is limited to the skill of the installer. Further, these types of infinite-adjustable systems often rely on compression on the fiber with a set screw or compression fitting to hold the fiber in place. When the angular distribution of the light is changed frequently, these mechanical stresses on the fiber will cause damage leading to further beam inconsistency and light loss.

It would thus be desirable to provide a light pipe fixture that allows easy adjustment of beam spreads of the light, even after the fixture has been installed.

It would further be desirable to provide a light pipe fixture in which mechanical stresses imposed on the light pipe supplying light to the fixture is minimized.

SUMMARY OF THE INVENTION

The invention provides, in a preferred form, a light pipe fixture with adjustable beam spreads. The fixture comprises a bayonet assembly having a generally tubular coupling for receiving a light-dispensing end of a light pipe, and a receiver assembly. The receiver assembly has a generally tubular coupling for receiving therewithin the bayonet assembly coupling at adjustable levels of penetration of the bayonet assembly coupling within the receiver assembly coupling. The receiver assembly further comprises an optical lens and a hollow portion for focusing a light beam from the end of the light pipe through the lens.

Preferably, the radial interior surface of the receiver assembly coupling and the radial exterior surface of the bayonet assembly coupling are so configured that the receiver assembly coupling slidably and lockingly receives the bayonet assembly coupling in any of a plurality of positions along the length of the receiver assembly coupling, so as to allow for different discrete distances between the end of the fiber and the lens.

The foregoing structures provide a light pipe fixture that allows easy adjustment of beam spreads of the light, even after the fixture has been installed. Other advantages and features of the invention will become apparent from the following specification.

DESCRIPTION OF THE DRAWINGS

In the drawings, like reference numerals refer to like parts.

FIG. 2b is a sectional view of FIG. 2a taken at Arrows 2b—2b in FIG. 2a.

FIG. 3b is a sectional view of FIG. 3a taken at Arrows 3b—3b in FIG. 3a.

FIG. 5 is an isometric view of the bayonet assembly of FIG. 1.

FIG. 6a is a sectional, isometric view of the receiver assembly of FIG. 1; and FIG. 6b is an enlargement of the circled portion in FIG. 6a labeled FIG. 6b.

FIGS. 8a–8c show isometric views of a bayonet assembly and receiver assembly in various stages of interconnection for selecting a 15-degree light beam spread, with outer portions of the bayonet assembly removed or broken away to show more clearly positioning pads and attached circumferential flange stops of the receiver assembly; and FIG. 8d is an enlargement of the circled portion in FIG. 8c labeled FIG. 8d.

FIG. 13b is a side plan view of the arrangement of FIG. 13a.

FIG. 13d is a side plan view of the arrangement of FIG. 13a.

DETAILED DESCRIPTION OF THE INVENTION

This description covers three features relating to (1) bayonet and receiver assemblies, (2) a fixed-angle ceiling mount installation, and (3) an adjustable-angle ceiling mount installation.

1. Bayonet and Receiver Assemblies

Figure 1:
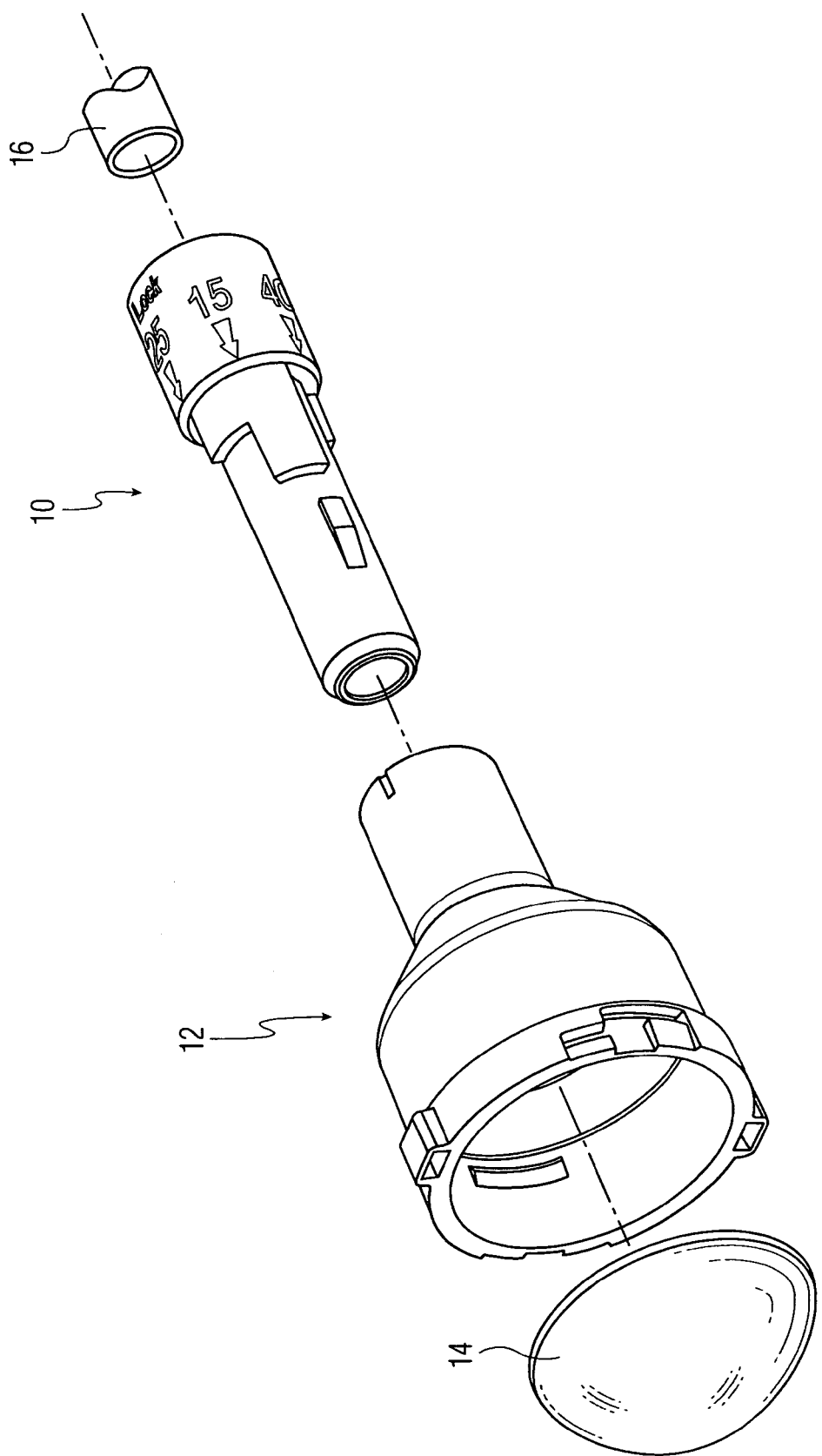
FIG. 1 is an isometric, exploded view of a bayonet assembly, light pipe, receiver assembly and lens in accordance with the invention.

FIG. 1 shows a bayonet assembly 10 and cooperating receiver assembly 12, which holds a lens 14. These three components are essential parts of the light pipe fixture of the invention. By way of example, lens 14 may be a plano-convex lens, an aspherical lens, a holographic lens, a Fresnel lens or a flat lens, made from either glass or plastic.

Figure 2A:
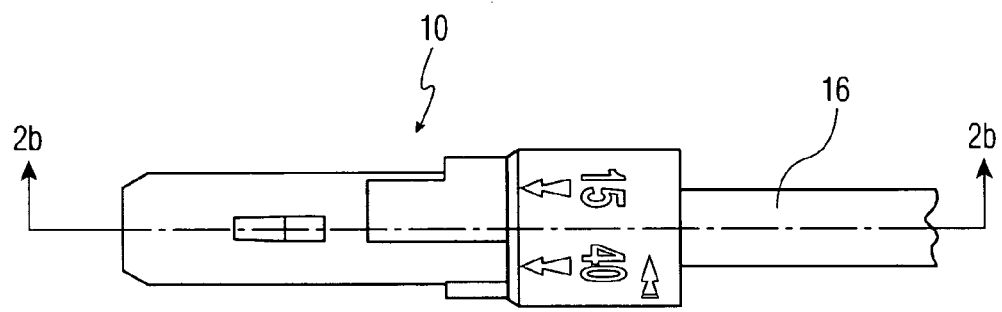
FIG. 2a is a side view of the bayonet assembly and light pipe of FIG. 1.
Figure 2B:
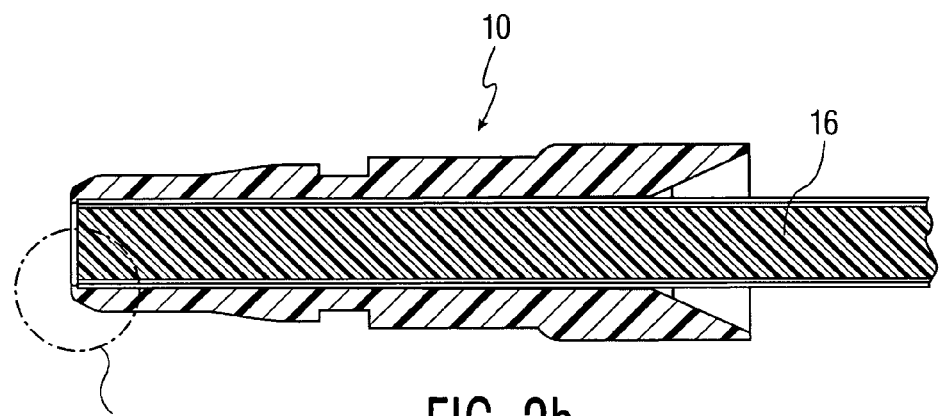
Figure 2C:
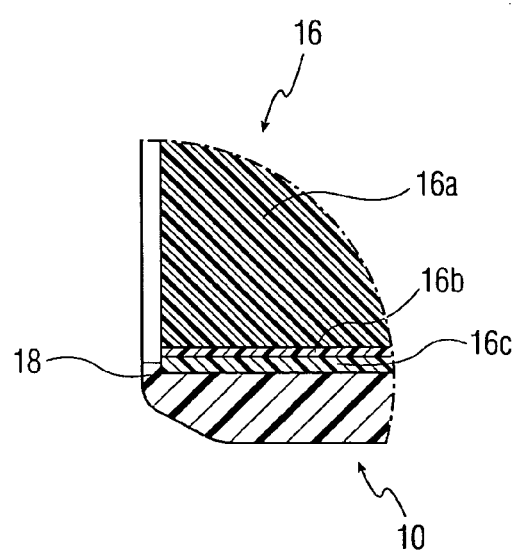
FIG. 2c is an enlargement of the circled portion of FIG. 2b labeled FIG. 2c.

Light pipe 16 is received into bayonet assembly 10 and secured in such assembly by an adhesive. As shown in connection with FIGS. 2a–2c, bayonet assembly 10 uses an internal lip 18 (FIG. 2c) to stop the inserted light pipe at a precise location.

Figure 3A:
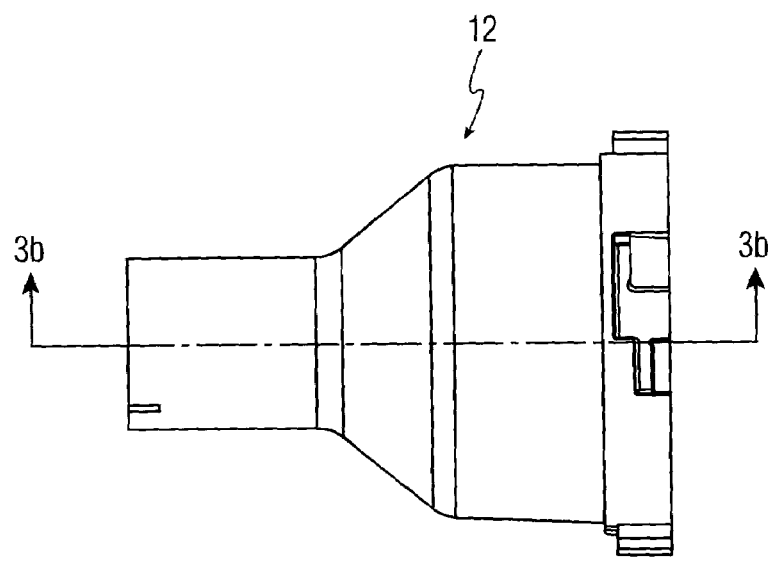
FIG. 3a is a side view of the receiver assembly of FIG. 1.
Figure 3B:
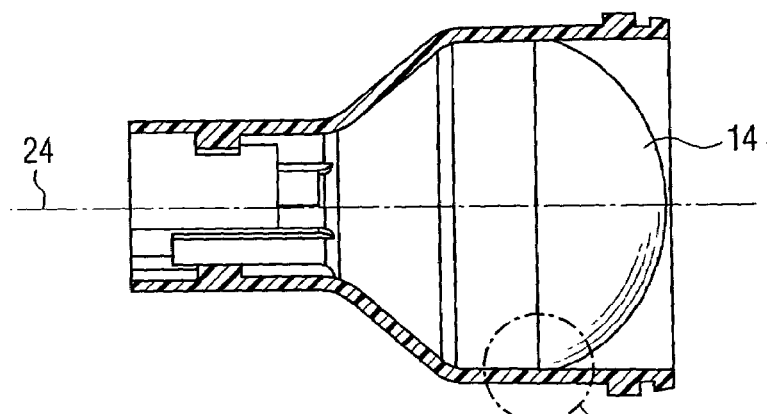
Figure 3C:
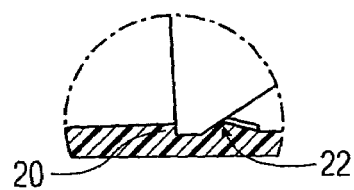
FIG. 3c is an enlargement of the circled portion of FIG. 3b labeled FIG. 3c.

As shown in connection with FIGS. 3a–3b, receiver assembly 12 utilizes an internal shelf 20 (FIG. 3c) and radial snaps 22 (FIG. 3c) to lock the lens into a precise location. With receiver assembly 12 being molded from Acrylonitrile Butadiene Styrene (ABS), for instance, radial snaps 22, preferably two in number, preferably occupy between about 5 and 20 degrees of circumference about a longitudinal axis 24 of such assembly, and more preferably between about 5 and 15 degrees. Preferably, the ABS for the receiver assembly is "platable" in that it can accept such coatings as chrome or brass, for reflective purposes.

Figure 4A:
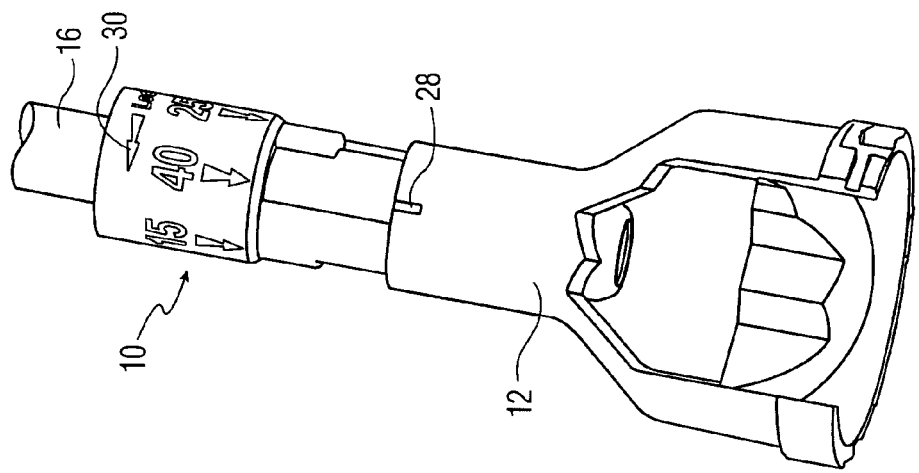
FIGS. 4a–4c are isometric views, partially cutaway, of initial relative positions of the bayonet and receiver assemblies of FIG. 1 for attaining different light beam spreads.
Figure 4B:
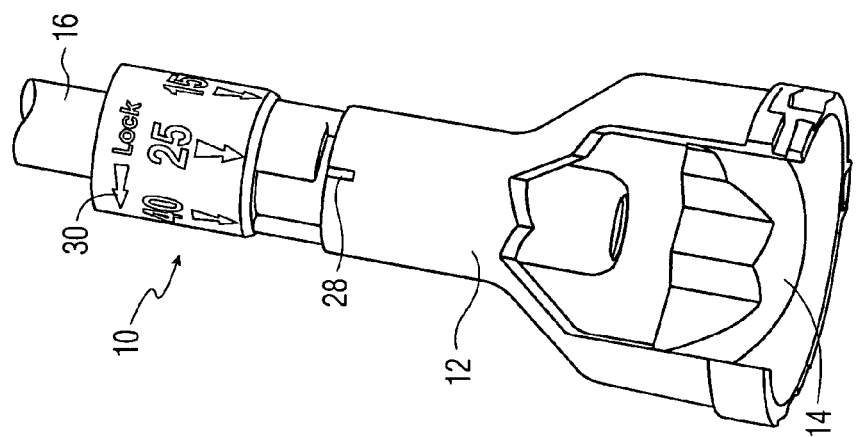
Figure 4C:
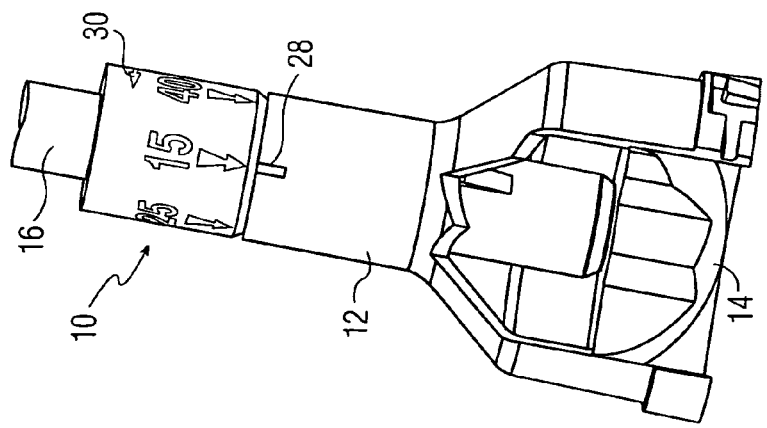

FIGS. 4a–4c show respective, initial relative positions of bayonet assembly 10 and receiver assembly 12 for achieving light beam spreads exiting lens 14 of degrees of 15, 25 and 40, respectively, by way of example. In the positions shown, a notch 28 or other mark on receiver assembly 12 is aligned with markings on the bayonet assembly 10 for a desired degree of beam spread; for instance, FIG. 4a showing notch 28 aligned with "15" for a 15-degree beam spread. Each of the various beam spread adjustment locations is clearly marked on bayonet.

In more detail, a user inserts bayonet assembly 10 into receiver assembly 12 as shown in any of FIGS. 4a–4c until the bayonet assembly reaches a full stop within receiver assembly 10. The user then rotates the bayonet assembly relative to the receiver assembly in the direction of an arrow 30 until a full rotational stop is reached, at which point the bayonet assembly becomes locked to the receiver assembly. For the embodiment shown, the rotation of bayonet assembly 10 relative to receiver assembly 12 is $\frac{1}{12}^{th}$ turn, or 30 degrees.

The foregoing lock-in adjustment location ability of the bayonet & receiver assembly arrangement is made possible by appropriate contouring of the confronting surfaces of the bayonet assembly 10 and receiver assembly 12. With reference to FIG. 5, bayonet assembly 10 uses an axial stop ledge 32 and circumferential lock flange 34 that extend radially outwards from a substantially cylindrical surface 36, which is a surface that radially bears against cooperating surfaces of receiver assembly 12. Axial stop ledge 32 is axially aligned with lock flange 34. The additional geometric structures on the bayonet assembly (e.g., 37) allow for clearance for different beam-spread positions and may also block contaminants, as described below.

At this point, it should be noted that the described radially outwardly facing surface of bayonet assembly 10 forms a pattern from about 180 degrees about a longitudinal axis 38 of the assembly, which pattern repeats for the other approximately 180 degrees about such longitudinal axis. This same approximately 180-degree repeating of patterns applies also to receiver assembly 12.

Now, referring to receiver assembly 12 of FIGS. 6a and 6b, receiving channels 40, circumferential flange stops 42 and axial positioning pads 44 are shown extending radially inwardly from a generally cylindrical surface 46. Flange stops 42 and positioning pads 44 are mounted on a radial bearing region 45, which extends towards axis 38 from surface 46. Radial bearing surface 45 supports radial bearing loads when the bayonet assembly is inserted into the receiver assembly, and structurally supports positioning pads 44. Another function of radial bearing surface 45 will be described below.

During insertion of bayonet assembly 10 (FIG. 5) into receiver assembly 12 (FIG. 6*a*), circumferential lock flange 34 (FIG. 5) is guided into a receiving channel 40 (FIG. 6*a*), such as vertically middle-shown channel 40, until axial stop ledge 32 (FIG. 5) abuts the vertically lowermost-shown positioning pad 44 (FIG. 6*a*). At this point, bayonet assembly 10 is then turned 30° clockwise relative to receiver assembly 12 so that circumferential lock flange 34 (FIG. 5) passes a cam lock point (or projection) 48 (FIG. 6*b*) to lock the circumferential lock flange against a circumferential flange stop. In this position (not shown), a positioning pad 44 (FIG. 6*a*) is sandwiched in the axial space between circumferential stop flange 34 and axial stop ledge 32. This operation can be more easily understood with reference to FIGS. 7*a*–7*b* and 8*a*–8*c*.

Figure 7A:
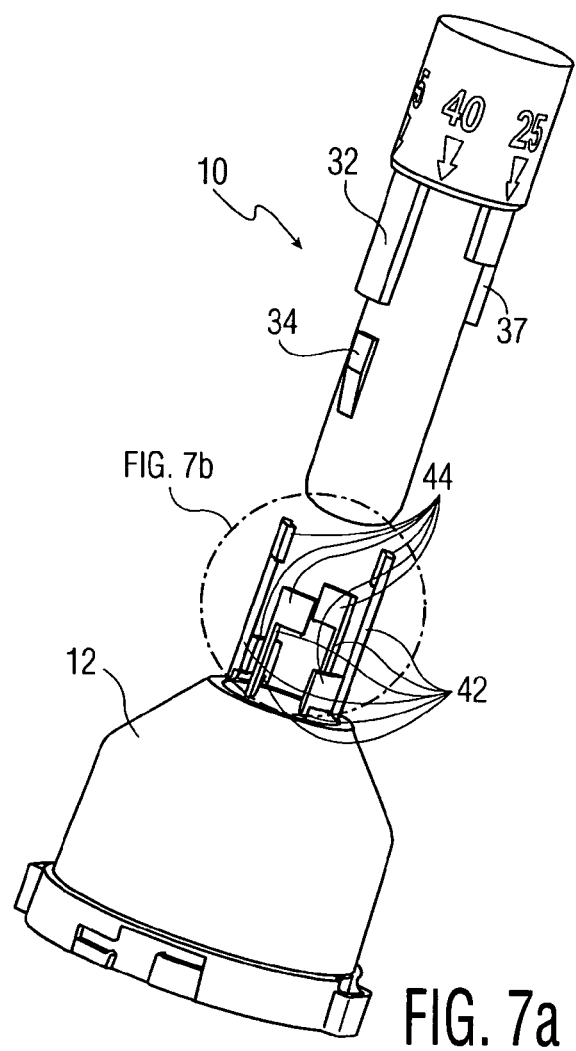
FIG. 7a is an isometric view of a bayonet assembly and a receiver assembly, with the receiver assembly shown without the surface on which positioning pads and circumferential flange stops are mounted, for simplicity of illustration.
Figure 7B:
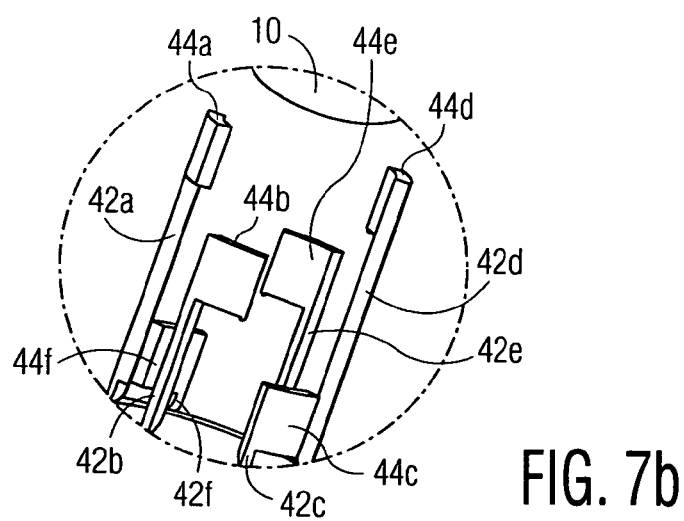
FIG. 7b is an enlargement of the circled portion in FIG. 7a labeled FIG. 7b.

As in FIG. 5, FIG. 7*a* shows bayonet assembly 10 with axial stop ledge 32, circumferential lock flange 34 and additional structure 37. As in FIG. 6*a*, FIG. 7*a* also shows receiver assembly 12 with circumferential flange stops 42 and axial positioning pads 44. However, FIG. 7*a* has been simplified by omitting the mounting surface for these stops 42 and pads 44, as is shown at 45 in FIG. 6*a*; and FIG. 7*b* shows these structures as six stops 42*a*–42*f* and six pads 44*a*–44*f*. For practicality, it is preferred that the number of stops and pads be four, six (as shown) or eight.

With the foregoing structure in mind, the selection of a 15-degree beam spread is shown in FIGS. 8*a*–8*c*. FIG. 8*a* shows the insertion of circumferential lock flange 34 into the receiving channel 40 between axial positioning pads 44*a* and 44*b*. FIG. 8*b* shows the final extent of insertion of lock flange 34, when axial stop ledge 32 abuts axial positioning pad 44*a*. Then, bayonet assembly 10 is then rotated 30 degrees clockwise relative to receiver assembly 12, as shown in FIG. 8*c*, at which point axial positioning pad 44*b* is sandwiched between axial stop ledge 32 and circumferential lock flange 34. At this point, also, axial stop ledge 32 stops rotating since it then abuts circumferential flange stop 42*a*. At this point, finally, as shown in the detail view of FIG. 8*d*, lock flange 34 has rotated past a cam lock projection 54 on positioning pad 44*b*, which locks in the bayonet assembly relative to the receiver assembly at the 15-degree beam spread position.

Figure 8E:
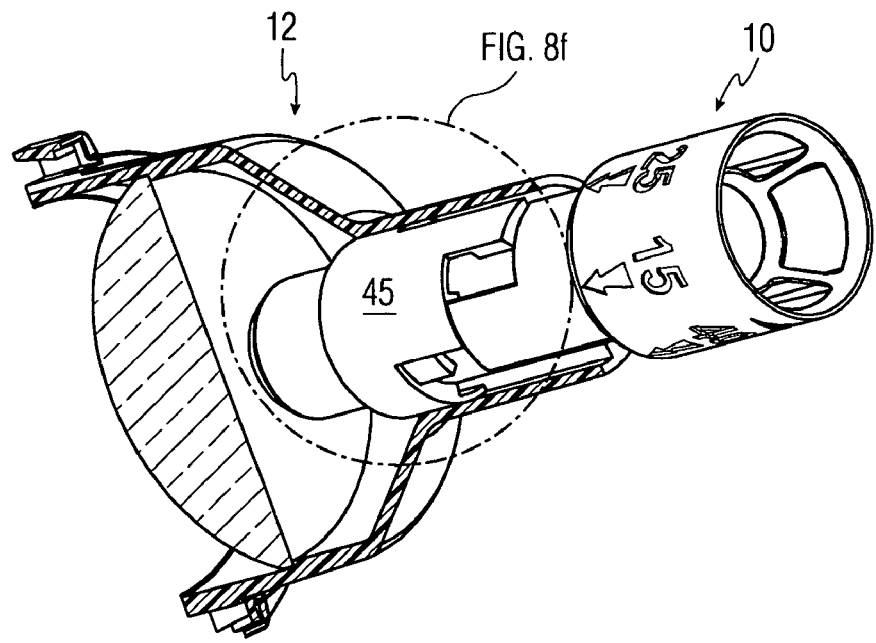
FIG. 8e is an isometric view of a portion of the bayonet and receiver assemblies of FIG. 1, partially in cross section, with an outer portion of the bayonet assembly removed to show more clearly a radial-bearing region.
Figure 8F:
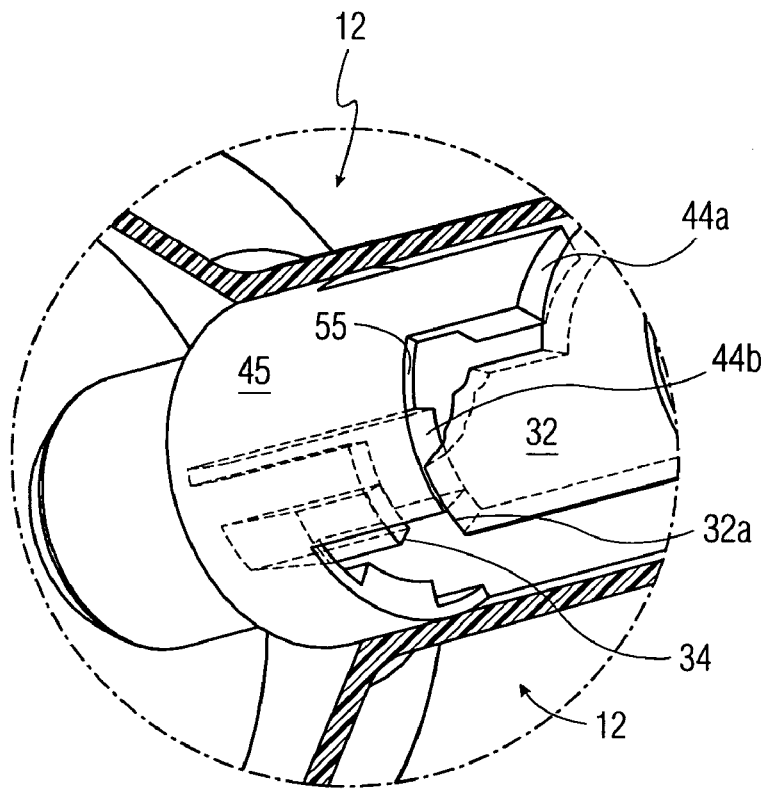
FIG. 8f is an enlargement of the circled portion in FIG. 8e labeled FIG. 8f, shown partially broken away.

FIG. 8*e* shows bayonet assembly 10 and receiver assembly 12. This figure shows assembly 10 partially in cross section and with an outer portion removed to show more clearly radial-bearing region 45, described above in connection with FIG. 6*a*. The enlarged view of FIG. 8*f* shows radial-bearing region 45 of receiver assembly 12 supporting positioning pads 44*a* and 44*b*. It further shows circumferential lock flange 34 of bayonet assembly 10 extending axially past positioning pad 44*b*, and circumferentially positioned so that it has started to pass under positioning pad 44*b*. Surface 32*a* of axial stop ledge 32 of the bayonet assembly axially abuts positioning pad 44*b*, similar to the position shown in FIG. 8*b*. Part of surface 32*a*, shown broken away, also abuts a portion of an annular shelf 55 of radial-bearing region 45. Upon rotating bayonet assembly 10 clockwise in relation to receiver assembly (such rotation not shown in FIG. 8*f*), when viewing from right to left in FIG. 8*f*, surface 32*a* of stop ledge 32 continues to abut, and be supported by, annular shelf 55. Preferably, annular shelf 55 of radial-bearing region 45 forms a continuous annular surface with positioning pad 44*b*, which continuous annular surface fully supports the entire surface 32*a* of ledge 32. This provides a stable coupling between the bayonet and receiver assemblies, and help assure that the locking action described above in connection with FIG. 6*b* will reliably occur.

In the embodiment illustrated herein, annular shelves such as that shown in FIG. 8*f* at 55 are associated with positioning pads 44*b* and 44*c* (FIG. 7*b*), but not with positioning pad 44*a*.

The above-described bayonet assembly 10 and receiver assembly 12 were designed as molded components, with bayonet assembly 10 of polycarbonate plastic and receiver assembly of platable ABS, as mentioned above. This provides low cost and an easily reproducible product.

Figure 8G:
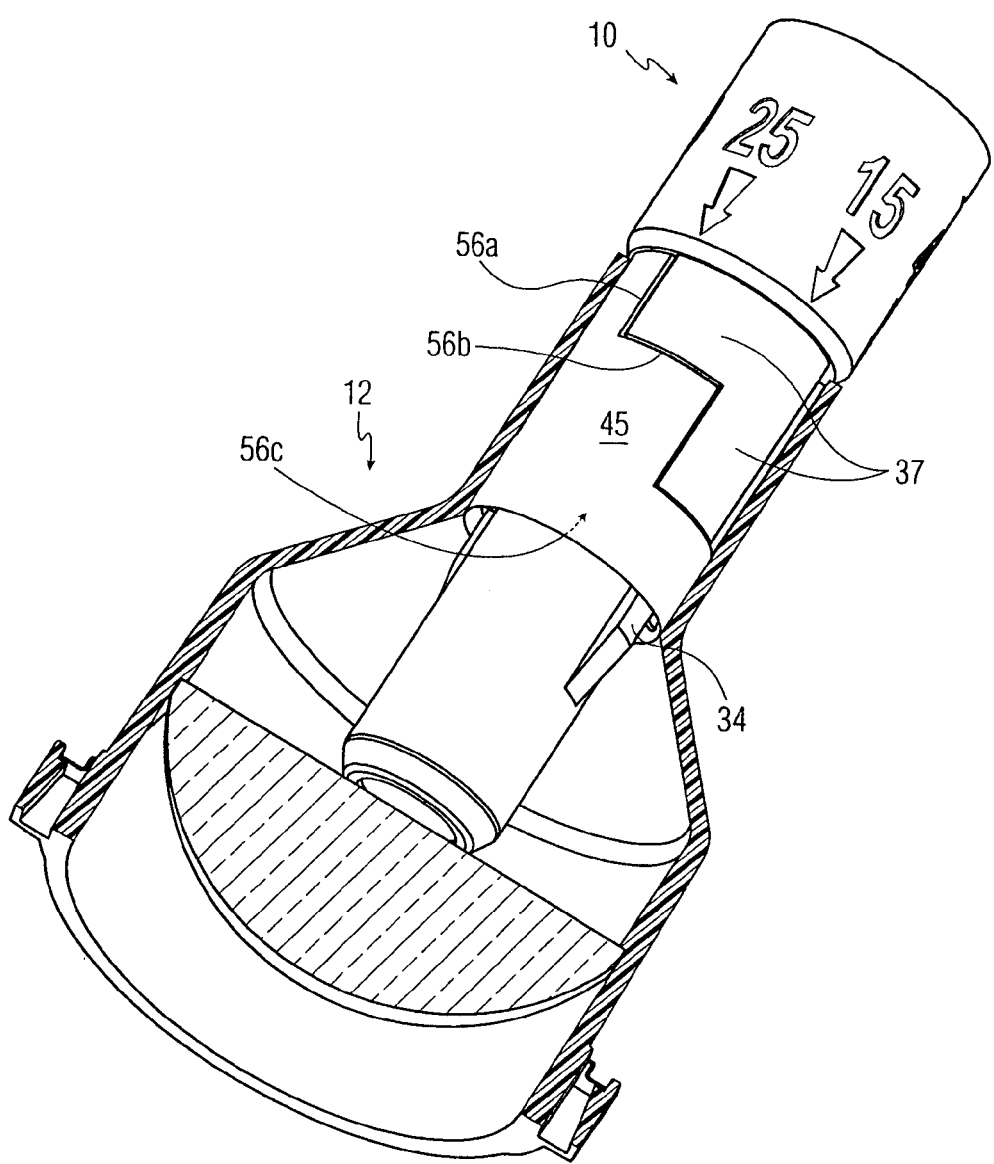
FIG. 8g is an isometric view of the bayonet and receiver assemblies of FIG. 1. The figure shows the receiver assembly partially in cross section and with an outer portion removed in the vicinity of the bayonet assembly to portray more clearly a radial-bearing section of the receiver assembly.

In addition, in the one of the three beam-spread positions in which the bayonet assembly is inserted the furthest into the receiver assembly, the present design blocks contaminants from reaching the light pipe. In particular, such interstices are configured to block any direct path for contaminants to reach the light-dispensing end of the light pipe when the bayonet assembly is locked in position with the receiver assembly. This is shown in FIG. 8*g*, wherein structure 37 of bayonet assembly cooperates with radial-bearing region 45 of the receiver assembly to block a direct path for contaminants to reach the light pipe when the bayonet and receiver assemblies are locked together. FIG. 8*g* shows interstice 56*a* between circumferentially adjacent surfaces of 37 and 45, interstice 56*b* between axially adjacent surfaces of 37 and 45, and interstice 56*c* between radially adjacent surfaces 56*c*. Thus, although not sealed, the foregoing design is considered closed, since it does not allow a direct path for dust, spray, or insects to reach the light pipe end.

Many earlier designs were abandoned because the components were not easily moldable.

The receiver assembly, in particular, was the most difficult to design for molding as a component that was closed to contaminants as described above. The small bore size of the receiver assembly's area for receiving the bayonet assembly—typically about 20 mm—made any common undercut (or snap pocket) impossible to mold. Although the use of exterior inserted slide cores in a mold would have made the bayonet and receiver assemblies easy to make and effective, the receiver assembly's bore size needed to be kept small to keep the costs of the components and associated tooling reasonable and practical, as well to allow for mounting practical component sizes.

The illustrated design of the bayonet and receiver assemblies allows for the successful molding of these components, as well as maintaining the small bore size and closure of any direct path for contaminants to reach the light pipe end.

2. Fixed-Angle Ceiling-Mount Installation

Figure 9A:
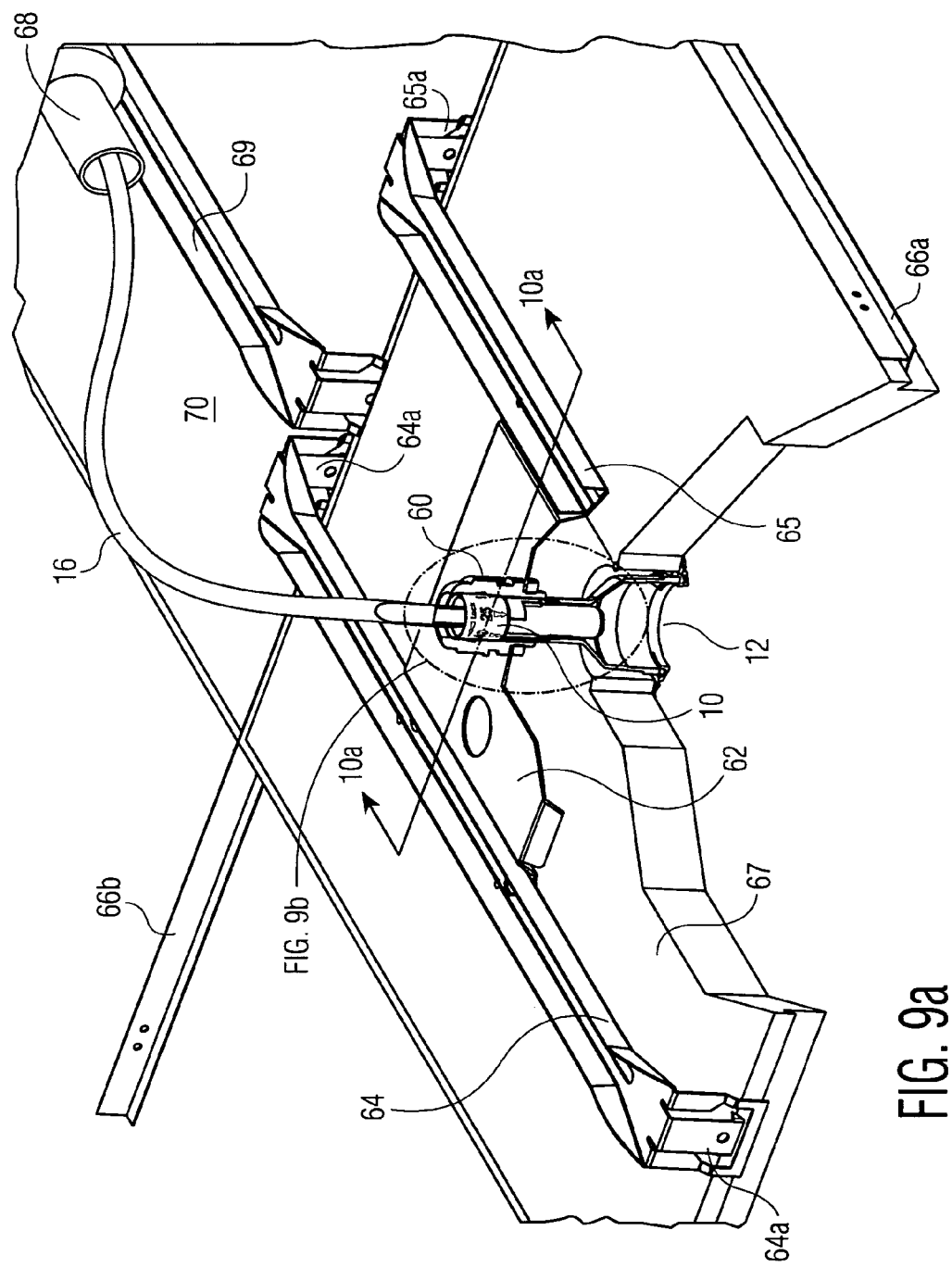
FIG. 9a is an upper isometric view, partially cutaway, of a fixed-angle ceiling mount installation using the bayonet and receiver assemblies of FIG. 1.

The light pipe fixture described above, including bayonet assembly and receiving assembly, is the base unit to a fixed-angle ceiling mount installation shown in FIG. 9*a*.

Figure 9B:
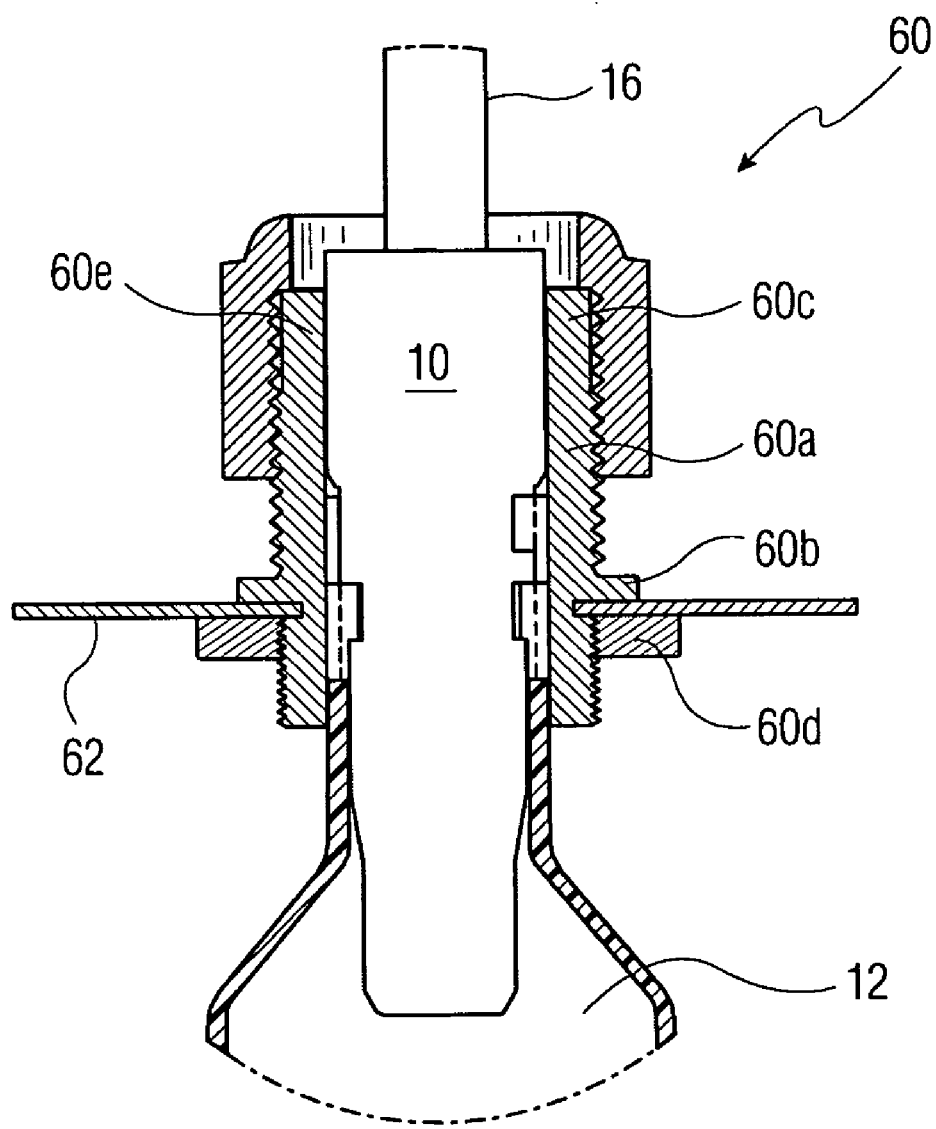
FIG. 9b is a simplified enlargement of the circled portion in FIG. 9a labeled FIG. 9b.

FIG. 9*a* shows a compression fitting 60 for holding bayonet assembly 10 to a sled 62 that is mounted on a pair of rails 64 and 65, which may be conventional Part No. 512HD sold by Erico International Corporation of Solon, Ohio. These rails have clamps 64*a* and 65*a* for attaching to the a standard "T" bar grid (e.g., 66*a*, 66*b*) for supporting ceiling tiles 67 and 70, for instance. Rails 64 and 65, in turn, are mounted above a ceiling tile 67, which may be a conventional ceiling tile used in office buildings. Light pipe 16 is supplied from a protective feeder pipe 68, mounted on a bracket 69, which in turn is mounted above another ceiling tile. In the foregoing arrangement, compression fitting 60 compresses against bayonet assembly 10, rather than against light pipe 16 as is traditional. Beneficially, this prevents kinking of light pipe 16 with resulting light output loss and damage upon installation FIG. 9b shows details of compression fitting 60 and associated structure, including bayonet assembly 10, receiver assembly 12 and light pipe 16. Compression fitting has a cylindrical shank 60a with threads above a fixed nut 60b on which a threaded compression nut 60c is received, and threads below fixed nut 60b for receiving a nut 60d. As is conventional, the upper portion 60e of shank 60a is not threaded, but rather has vertically extending slots (not shown). The vertical slots form a generally cylindrical structure that is compressed against the upper portion of bayonet assembly 10 to fix compression fitting 60 in relation to the bayonet assembly. Nut 60d then torques an annular portion of sled 62 against fixed nut 60b, so as to fix compression fitting 60 in relation to sled 62.

Referring to FIG. 9a, bayonet assembly 10 holds receiver assembly 12 in place, due to their mutual lock-in arrangement described above. With the mounting arrangement of FIG. 9a, the angle of receiver assembly 12 and its lens remains fixed relative to the associated ceiling tile 67.

Figure 10A:
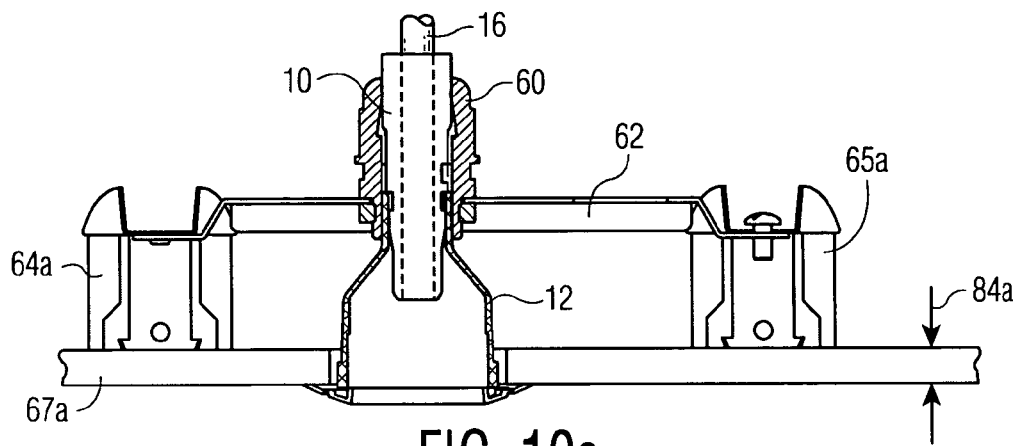
FIGS. 10a–10c show parts of the structure of FIG. 9a as viewed at Arrows 10a—10a in FIG. 9a and are partially in cross section, the different figures showing different heights of the bayonet assembly relative to a sled.
Figure 10B:
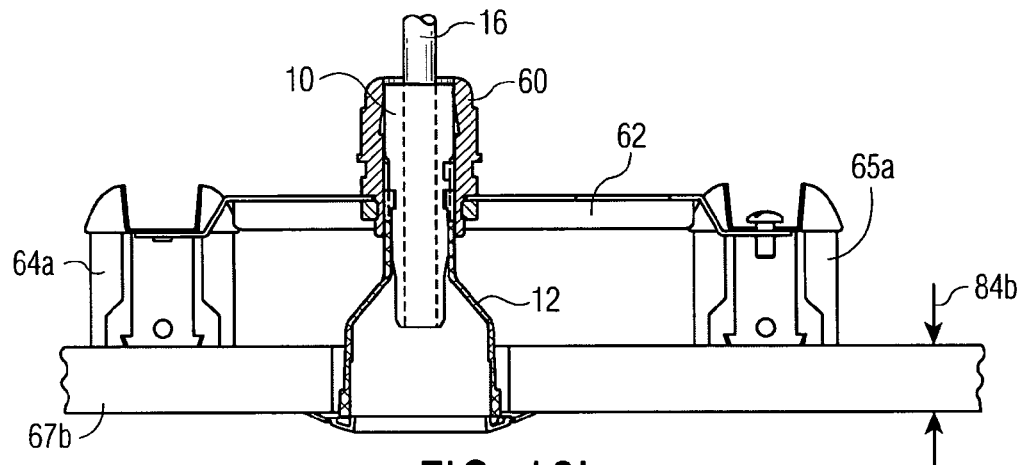
Figure 10C:
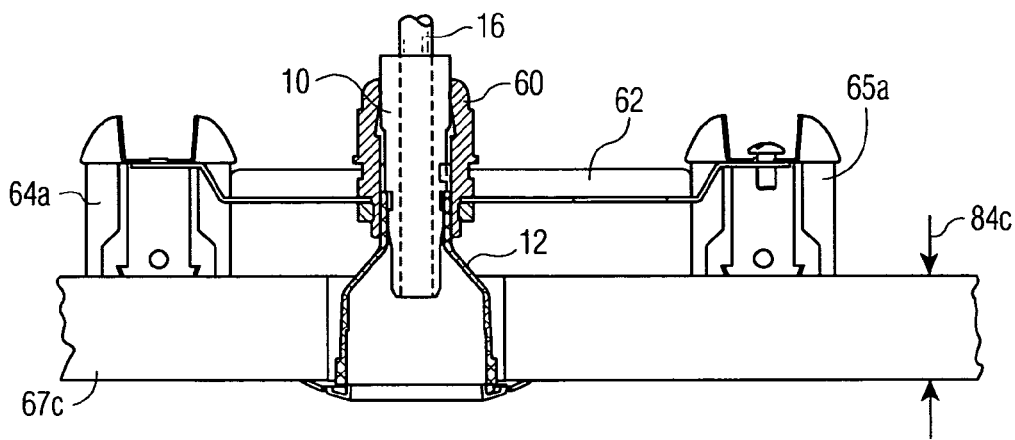

The height of bayonet assembly 10 can be adjusted vertically along the longitudinal axis of compression fitting 60. This is important to be able to accommodate ceiling tiles of different thicknesses, as shown in FIGS. 10a–10c. These figures, which use the same reference numerals as in FIG. 9a, show three different height adjustments of bayonet assembly 10, for accommodating ceiling tiles 67a, 67b and 67c of different thicknesses; for instance, thickness 84a (FIG. 10a) of 0.5 inch, 84b (FIG. 10b) of 1 inch, and 84c (FIG. 10c) 1.5 inch. In FIG. 10c, sled 62 is inverted from its position in FIGS. 10a and 10b.

Referring to FIG. 9a, sled 62 is shown mounted on rails 64 and 65. The sled can attach to other mounting means such as a so-called Butterfly Mount. Such Butterfly Mount is sold, for instance, by RSA Lighting LLC of Chatsworth, Calif., as part light fixture assembly Part No. CO111STR. Other mounting means will be apparent to those of ordinary skill in the art based on the present specification. Such other mounting means may allow sled 62 to slide to different positions or to otherwise be mounted in different position, or may only allow mounting in a fixed position.

3. Adjustable-Angle Ceiling-Mount Installation

Figure 11:
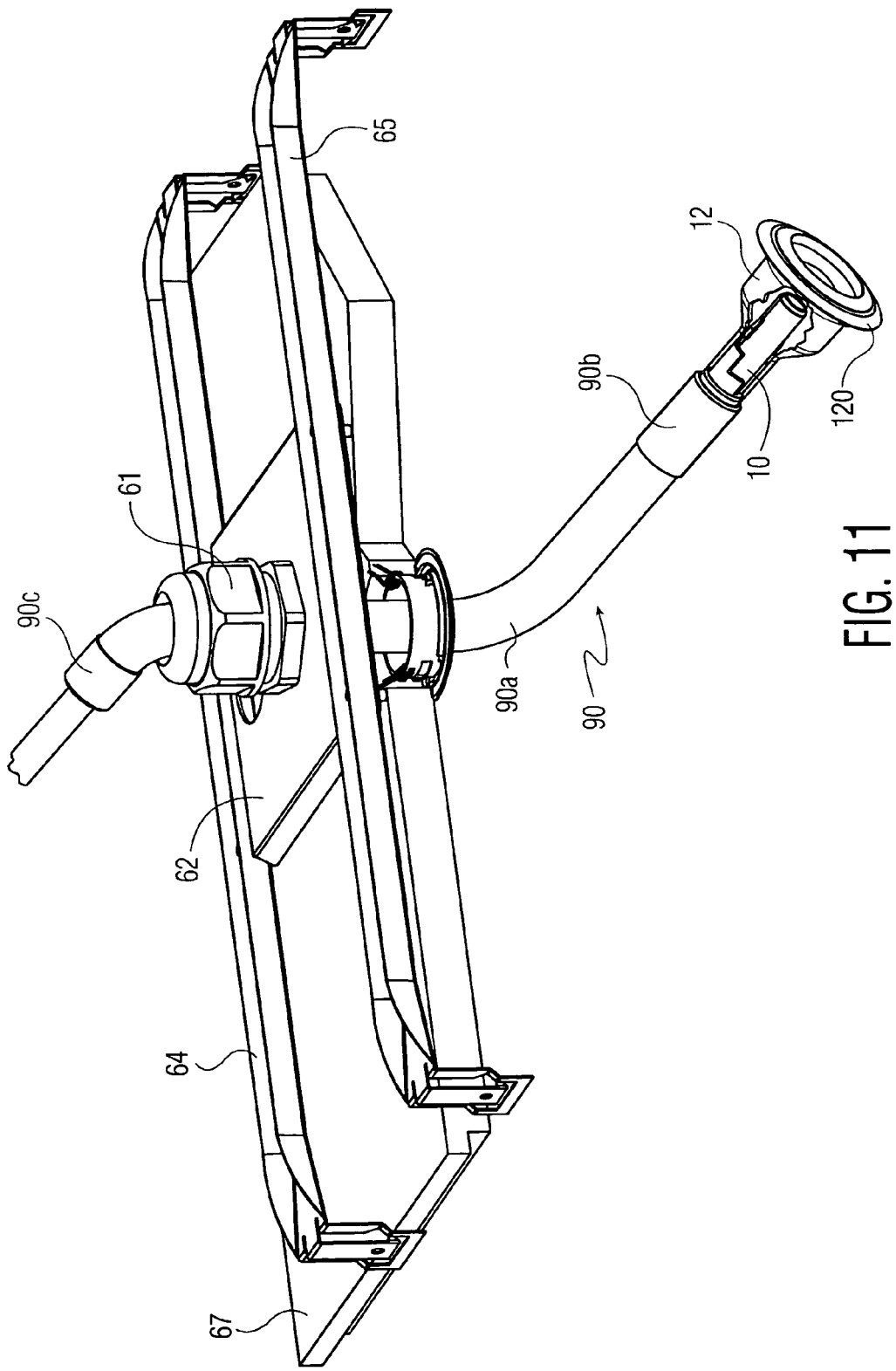
FIG. 11 is an upper isometric view, partially cutaway, of an adjustable-angle ceiling mounting fixture using the bayonet and receiver assemblies of FIG. 1.

In some light-fixture installations, it may be desirable to have the ability to repeatedly adjust the angle of the light. Thus, FIG. 11 shows a flexible gooseneck 90, which, once bent, retains its position. The flexible portion of gooseneck 90, numbered 90a, may comprise helically wound metal (not shown) as is conventional, and the ends 90b and 90c of the gooseneck may include cylindrical sleeves. Sleeve 90b mounts about bayonet assembly 10 and is held with adhesive. Gooseneck 90 may be a conventional Part No. 96070 sold by Moffatt Products, Inc. Inc. of Watertown, S. Dak.

Compression fitting 61, which is typically larger than compression fitting 60 of FIG. 9a, compresses against flexible portion 90a of gooseneck 90, rather than against light pipe 16 as is traditional. Beneficially, this prevents kinking of light pipe 16 and resulting light output loss and damage upon installation.

By using the gooseneck 90 and compression fitting 61 of FIG. 11 instead of compression fitting 60 of FIG. 9c, the angle of direction of receiver assembly 12 can be easily, and repeatedly, manipulated as desired.

As will be shown in the further drawing figures, the receiver assembly described herein may be designed to accommodate various beauty rings and an optional filter (not shown). Optional filters may comprise a beam-filtering lens, a coloring lens or a diffusing lens, by way of example.

Figure 12A:
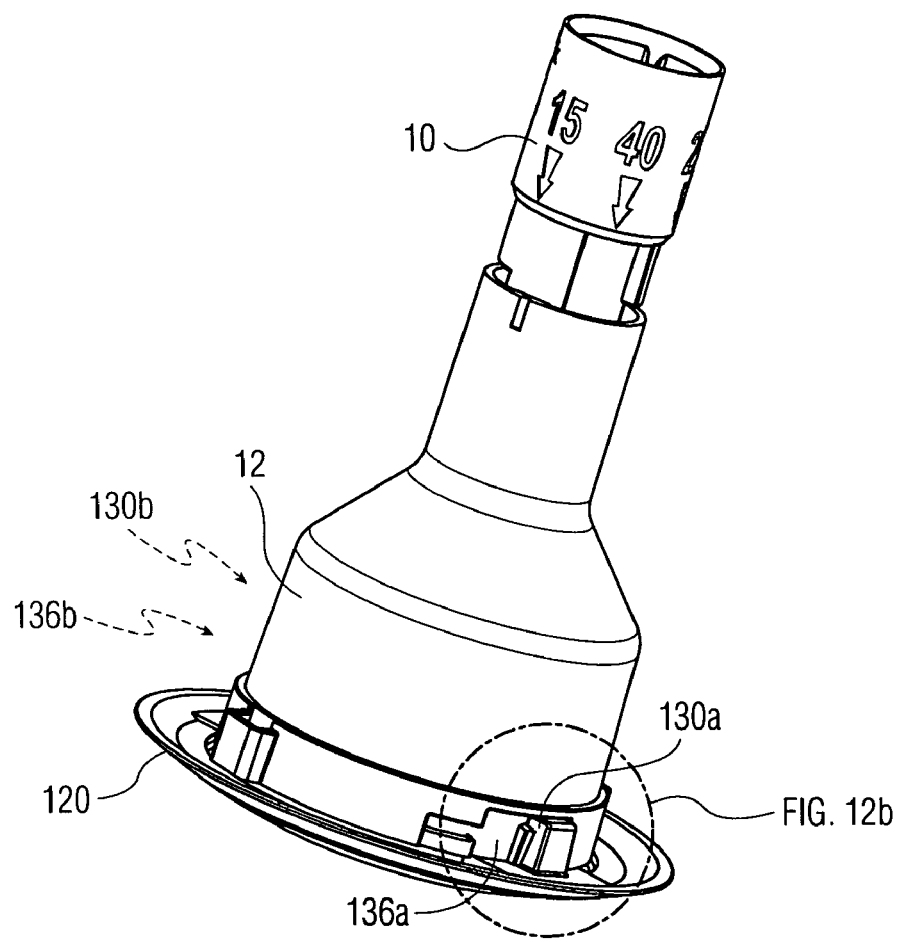
FIG. 12a is an isometric view of the bayonet and receiver assemblies of FIG. 1, including a beauty ring as also shown in FIG. 11.
Figure 12B:
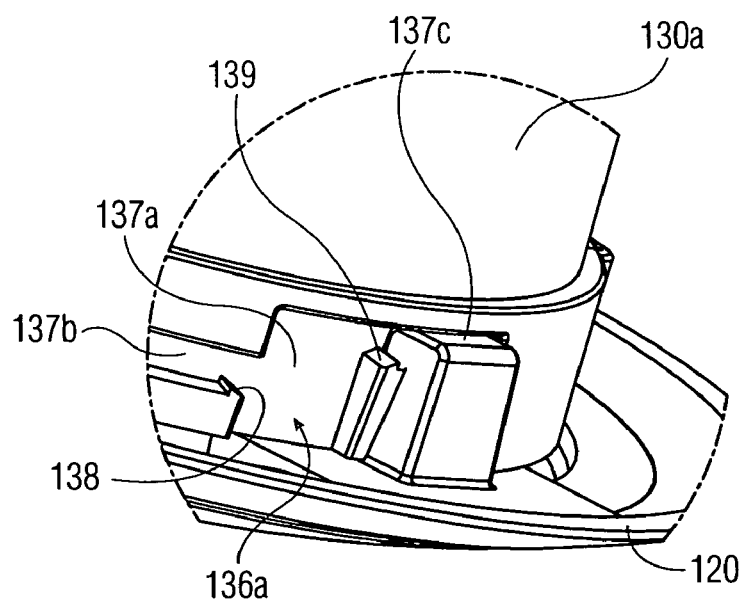
FIG. 12b is an enlargement of the circled portion of FIG. 12a labeled FIG. 12b.

Thus, FIG. 12a shows a beauty ring 120 affixed to receiver assembly 12 tightly; that is, without clearance required for a typical optional filter of about 4 mm thickness. Ring 120 has a pair of similar, axially extending first and second latches 130a and 130b (behind assembly 12). As shown best in FIG. 12b, the lower end of receiver assembly 12 has similar first and second recesses 136a and 136b (behind assembly 12) for receiving first and second latches 130a and 130b. As shown in FIG. 12b, recess 136a has a central path 137a extending axially, and first and second paths 137b and 137c extending in opposite circumferential directions from the central path at respectively different axial positions. The entranceways to first and second paths 137b and 137c have respective cam lock ramps 138 and 139, for locking beauty ring 120 onto receiver assembly 12.

Figure 12C:
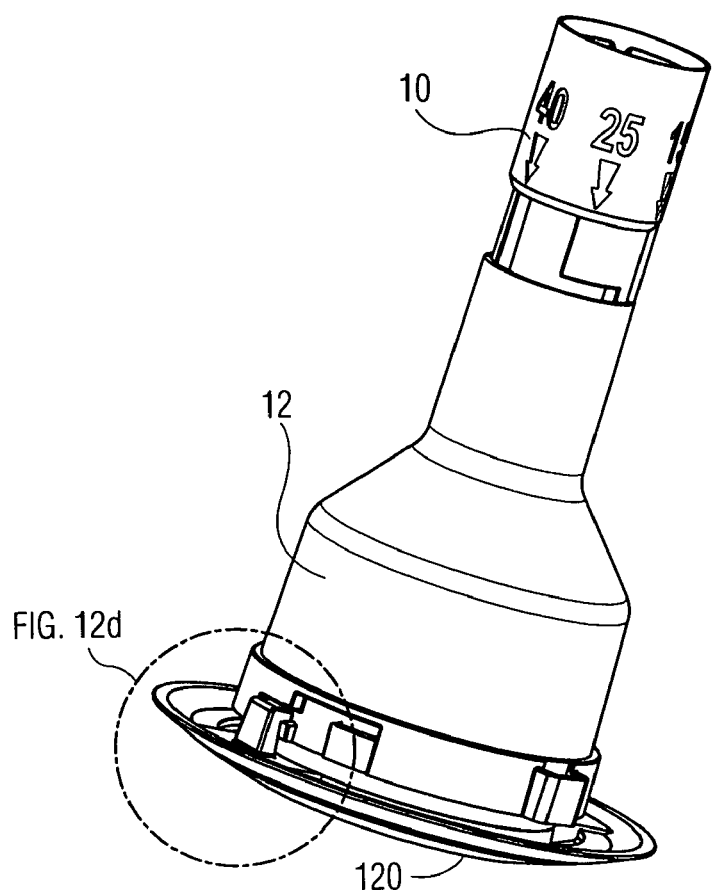
FIGS. 12c and 12d are like FIGS. 12a and 12b, respectively, but show the beauty ring further away from the receiver assembly.
Figure 12D:
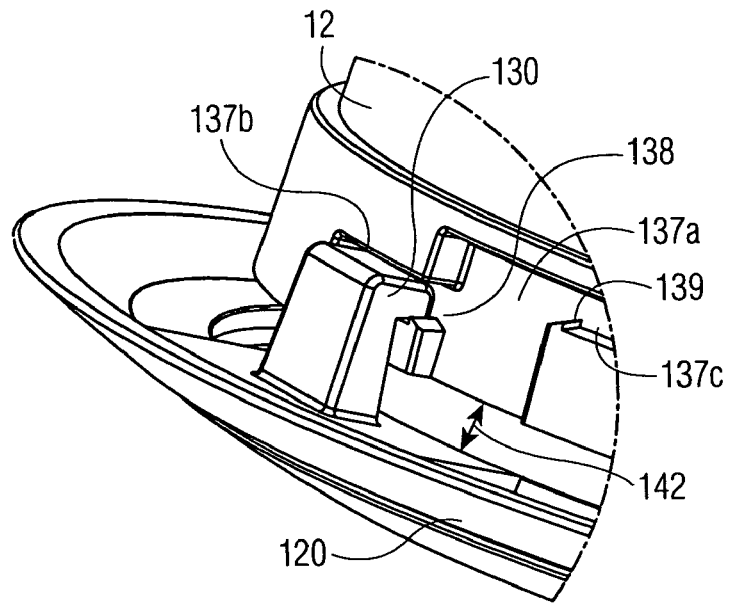

As shown in FIGS. 12a and 12b, with latch 130a received in path 137c, beauty ring 120 fits close to receiver assembly 12. In such position, there is insufficient space between ring and assembly for a optical filter that typically is about 4 mm thick. In contrast, as shown in FIGS. 12c and 12d, with latch 130 received in path 137b, sufficient clearance 142 between ring and assembly exists for receiving an optical filter (not shown) of typically 4 mm thickness. However, as shown in FIGS. 12a and 12b, without clearance for a typical 4 mm filter, the beauty ring can be easily mounted to the receiver assembly, and light output is maximized since more light can pass through the beauty ring that when clearance is provided for an optical filter.

Figure 13A:
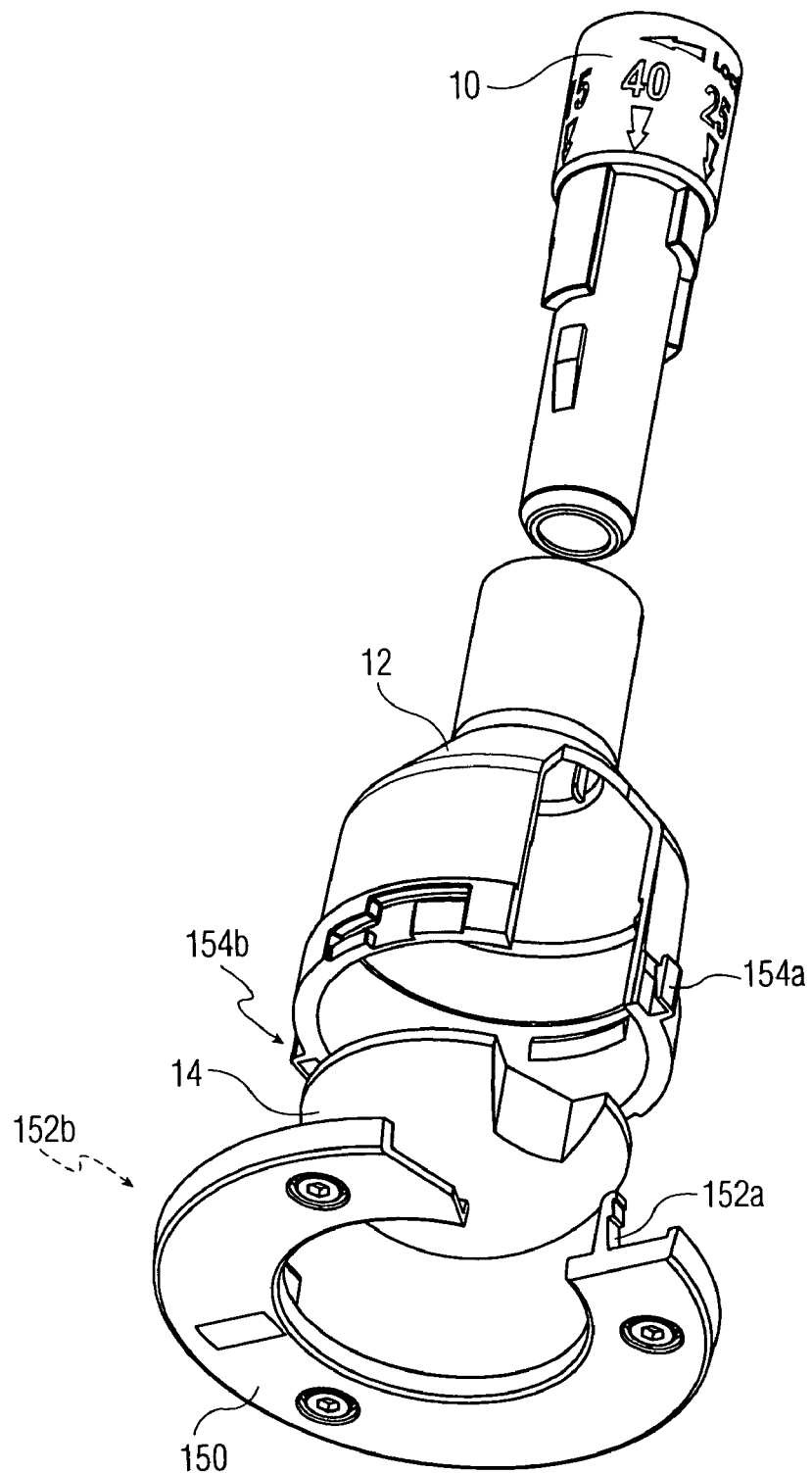
FIG. 13a is an exploded, isometric view of the bayonet and receiver assembly of FIG. 1, showing a different beauty ring that may be accommodated.

FIG. 13a shows bayonet assembly 10, receiver assembly 12 and lens 14, and a beauty ring 150 that can be used instead of ring 120 shown in FIGS. 12a–12d. Ring 150 includes a pair of axially extending mounting arms 152a and 152b (shown behind beauty ring 150). Receiver assembly 12 includes a pair of mounting apertures 154a and 154b for respectively receiving the mounting arms 152a and 152b.

Figure 13B:
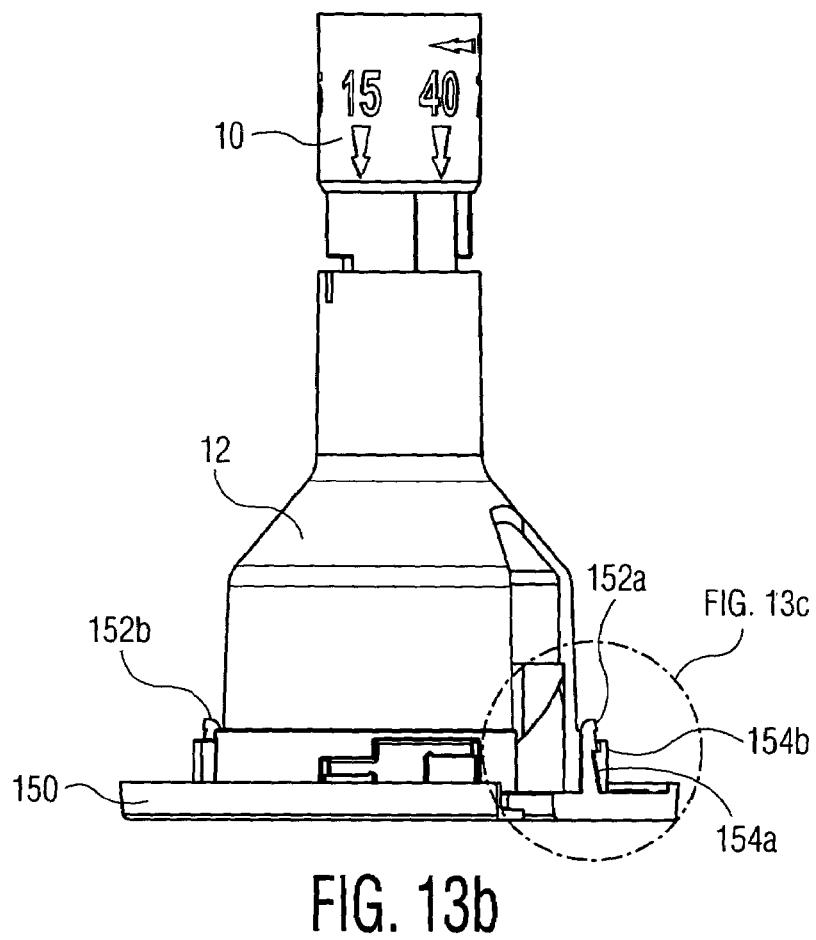
Figure 13C:
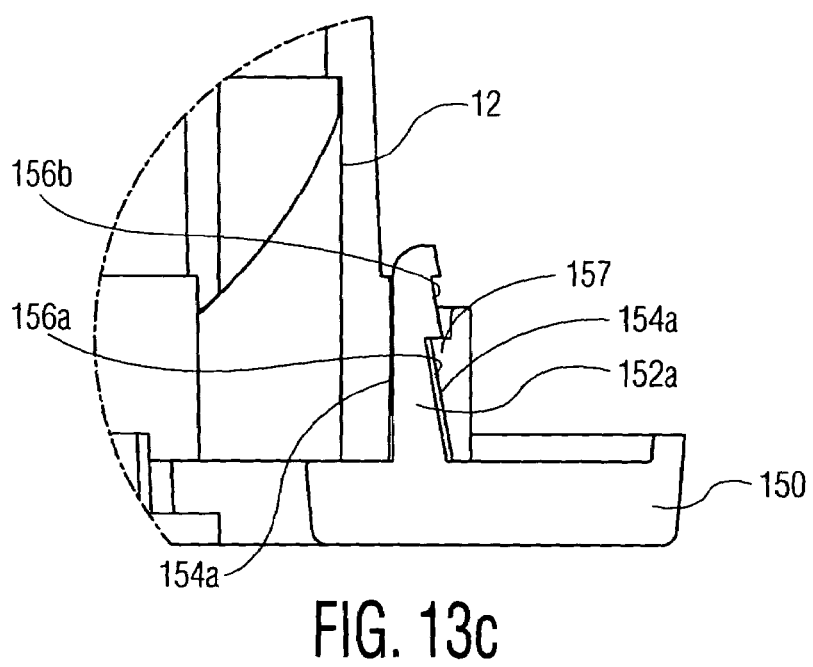
FIG. 13c is an enlargement of the circled portion of FIG. 13b labeled FIG. 13c.

As better seen in FIGS. 13b and 13c, in which there is insufficient clearance for a typical approx. 4 mm optical filter, mounting arm 152a includes a pair of axially spaced mounting valleys 156a and 156b that face radially and preferably radially outwards from a longitudinal axis of receiver assembly 12. Correspondingly, mounting aperture 154a includes a mounting ridge 157 for selectively being received in one or the other of mounting valley 156a or 156b. In FIG. 13c, mounting ridge 157 is received in mounting valley 156a, leaving insufficient space to accommodate an optional 4 mm thick filter. As such, however, the beauty ring can be easily mounted to the receiver assembly, and light output is maximized since more light can pass through the beauty ring that when clearance is provided for an optical filter.

Figure 13D:
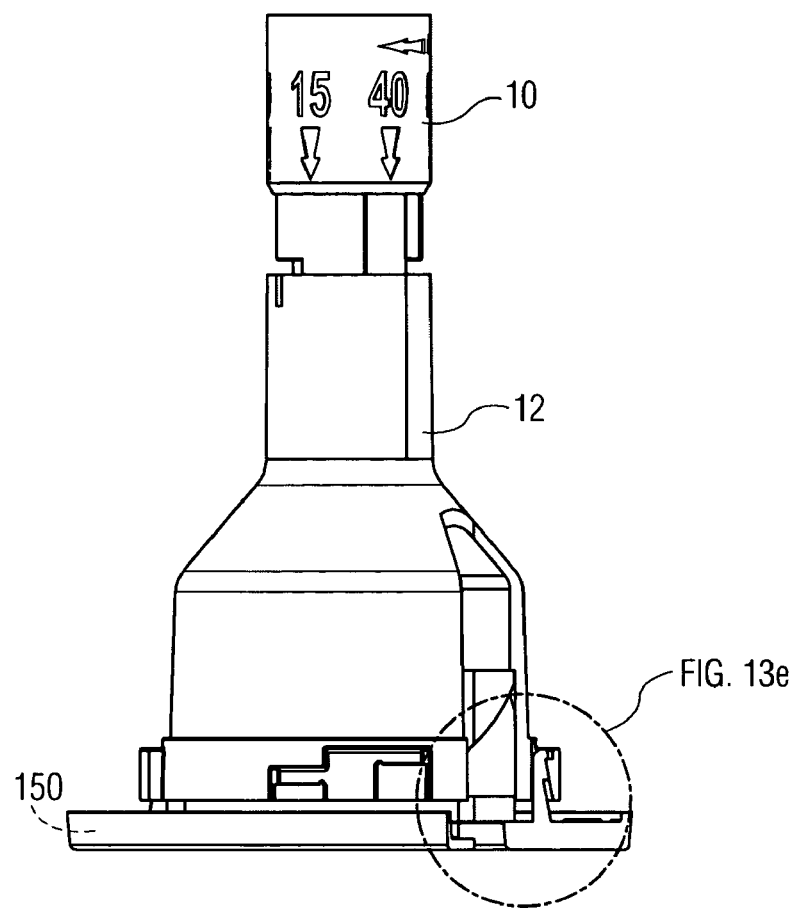
Figure 13E:
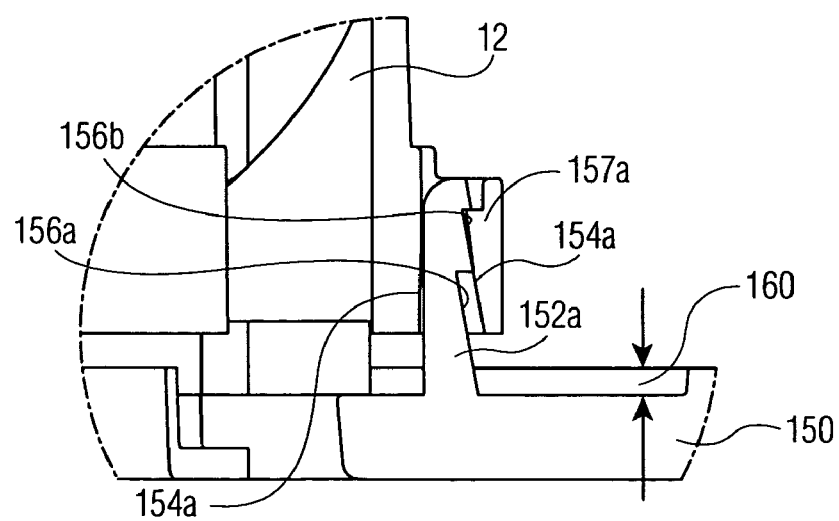
FIG. 13e is an enlargement of the circled portion of FIG. 13d labeled FIG. 13e.

FIGS. 13d and 13e correspond to FIGS. 13b and 13c except that, as shown in FIG. 13e, upper mounting valley 156b receives mounting ridge 157a. This provides a clearance 150 for a typical optical filter of about 4 mm thickness.

The receiver assembly of FIG. 1 beneficially incorporates both the structures shown in FIGS. 12a–12d and in FIGS. 13a–13e so improve its versatility and thus reduce the need to stock different receiver assemblies for using the different beauty rings.

While the invention has been described with respect to specific embodiments by way of illustration, many modifications and changes will occur to those of ordinary skill in the art. It is, therefore, to be understood that the appended claims are intended to cover all such modifications and changes as fall within the true scope and spirit of the invention.

What is claimed is:

1. A light pipe fixture with adjustable light beam spreads, comprising:
   a) a bayonet assembly having a generally tubular coupling for receiving a light-dispensing end of a light pipe; and
   b) a receiver assembly having:
      i) a generally tubular coupling for receiving therewithin the bayonet assembly coupling at adjustable levels of penetration of the bayonet assembly coupling within the receiver assembly coupling;
      ii) an optical lens; and
      iii) a hollow portion for focusing a light beam from the end of the light pipe through the lens;
   c) the bayonet assembly and receiver assembly sharing a main fixture axis.

2. The light pipe fixture of claim 1, wherein the radial interior surface of the receiver assembly coupling and the radial exterior surface of the bayonet assembly coupling are so configured that the receiver assembly coupling slidably and lockingly receives the bayonet assembly coupling in any of a plurality of positions along the length of the receiver assembly coupling, so as to allow for different discrete distances between the end of the fiber and the lens.

3. The light pipe fixture of claim 2, wherein;
   a) the radial interior surface of the receiver assembly coupling and the radial exterior surface of the bayonet assembly coupling comprises first and second sets of structures, respectively, or second and first sets of structures, respectively; the first set of structures comprising:
      i) a plurality of axial positioning pads positioned at different points along the main fixture axis; and
      ii) associated circumferential flange stops positioned in more towards the lens than the axial positioning pads;
      iii) receiving channels being defined between adjacent axial positioning pads;
   b) the second set of structures comprising:
      i) a plurality of axial stop ledges positioned at different points along the main fixture axis length for stopping against the axial positioning pads; and
      ii) a circumferential lock flange for being received in a respective receiving channel to an axial extent delimited by an axial stop ledge abutting against an axial positioning pad;
      iii) the circumferential lock flange and an axially aligned, axial stop ledge of the second set of structures defining an axial space therebetween for receiving a positioning pad of the first set of structures.

4. The light pipe fixture of claim 3, wherein:
   a) the first set of structures includes a radial-bearing region having a radially bearing surface positioned radially closer to the circumferential lock flange than a base surface of the first set of structures; and
   b) the radial positioning pads of the first set of structures are mounted on the radial-bearing region for making contact in the radial direction with the circumferential lock flange of the second set of structures.

5. The light pipe fixture of claim 4, wherein the radial-bearing region is shaped to create an annular shelf that adjoins, and is aligned axially with, an associated axial positioning pad, so as to create a substantially continuous annular surface for axially receiving a respective axial stop ledge in abutting relationship.

6. The light pipe of claim 5, wherein the continuous annular surface supports the entire axial portion of an associated axial stop ledge that faces axially in the direction of the associated positioning pad after a circumferential lock flange is inserted into a respective receiving channel and the first and second sets of structures are rotataed relative to each other until a circumferential lock flange circumferentially abuts a circumferential flange stop.

7. The light pipe fixture of claim 3, wherein a lens side of the axial positioning pads includes a cam lock projection extending axially toward the lens and circumferentially about the main fixture axis for circumferentially holding the circumferential stop ledge against an associated circumferential flange stop.

8. The light pipe fixture of claim 7, wherein the axial positioning pads with the cam lock projection and circumferential stop ledge are circumferentially spaced from each other rather than radially spaced from each other, so as to minimize the exterior dimension of the foregoing couplings.

9. The light pipe fixture of claim 1, 2, 3, 4, 5, 6 or 7, wherein the bayonet assembly coupling and the receiver assembly coupling include cooperating structures abutting each other at a cam lock point, with the cooperating structures being circumferentially spaced from each other rather than radially spaced from each other, so as to minimize the exterior dimension of the foregoing couplings.

10. The light pipe fixture of claim 3, 7 or 8, wherein the axial positioning pads and circumferential flange stops of the receiver assembly coupling and the axial positioning pads and circumferential lock flange of the bayonet assembly coupling form a pattern for approximately 180 degrees around the main axis of the respective couplings; the pattern being repeated for another approximately 180 degrees around the main axis of the respective couplings.

11. The light pipe fixture of claim 3, 7 or 8, wherein the first set of structures includes only six axial positioning pads arranged to provide for three axial positions of the bayonet assembly coupling relative to the receiver assembly coupling.

12. The light pipe fixture of claim 2, 3, 4, 5, 6, 7 or 8, wherein, in at least one beam-spread position, the radial exterior surface of the bayonet assembly coupling and the radial interior surface of the receiver assembly coupling are configured to block any direct path for contaminants to reach the light-dispensing end of the light pipe via the interstices between the foregoing surfaces when the bayonet assembly coupling is locked in position with the receiver assembly coupling.

13. The light pipe fixture of claim 12, wherein the radial bearing region of the first set of structures is configured to interfit with cooperating structure of the second set of structures to block any direct path for contaminants to reach the light-dispensing end of the light pipe via the interstices between the foregoing surfaces when the bayonet assembly coupling is locked in position with the receiver assembly coupling.

14. The light pipe fixture of claim 1, 2, 3, 7 or 8, wherein the bayonet assembly and the receiver assembly have cooperating markings thereon indicating the light beam spreads attainable at respective circumferential positions of the bayonet assembly and the receiver assembly.

15. The light pipe fixture of claim 1, wherein the first set of structures is on the receiver assembly.

16. The light pipe fixture of claim 1, 2, 3, 4, 5, 6, 7 or 8, further comprising a generally annular beauty ring covering an end of the receiver assembly for dispensing light.

17. The light pipe fixture of claim 16, wherein:
   a) the side of the beauty ring facing the receiver assembly has axially mounted first and second latches that extend radially inwardly;
   b) the light-dispensing end of the receiver assembly has first and second recesses for receiving the first and second latches, respectively; the first and second recesses having:
      i) a central path that extends axially; and
      ii) first and second paths extending in opposite circumferential directions from the central path at respectively different axial positions, for selectively receiving a latch of the beauty ring.

18. The light pipe fixture of claim 17, wherein the first and second paths are spaced axially such that, when a latch is in the first path, there is room for an optical filter of about 4 mm thickness to be positioned between the beauty ring and the receiver assembly, and, when a latch is in the second path, there is insufficient room for an optical filter of about 4 mm thickness to be positioned between the beauty ring and the receiver assembly.

19. The light pipe fixture of claim 17, wherein axial walls of the receiver assembly that define the first and second paths each have a cam lock ramp at the entranceway to the respective path from the central path.

20. The light pipe fixture of claim 16, wherein:
   a) the beauty ring includes a pair of axially extending mounting arms; and
   b) the receiver assembly includes a pair of mounting apertures for respectively receiving the mounting arms;
   c) the mounting arms including a pair of axially spaced mounting valleys, facing radially;
   d) the mounting apertures include a mounting ridge radially facing the pair of mounting valleys of an associated mounting arm for selectively being received in one or the other mounting valley.

21. The light pipe fixture of claim 16, wherein the receiver assembly accommodates first and second types of beauty rings by comprising:
   a) first and second recesses at a light-dispensing end for receiving first and second latches extending radially inwardly from a first type of beauty ring, respectively; the first and second recesses having:
      i) a central path that extends axially; and
      ii) first and second paths extending in opposite circumferential directions from the central path at respectively different axial positions, for selectively receiving a latch of the first type of beauty ring; and
   b) a pair of mounting apertures for respectively receiving a pair of axially extending mounting arms of a second type of beauty ring; the mounting apertures including a mounting ridge radially facing a pair of mounting valleys of an associated mounting arm of the second type of beauty ring for selectively being mounted in one or the other mounting valley.

22. The light pipe fixture of claim 1, 2, 3, 4, 5, 6, 7 or 8, further comprising a mounting arrangement for the bayonet assembly and receiver assembly; the mounting arrangement comprising:
   a) a sled; and
   b) a generally tubular, threaded compression fitting for mounting the bayonet assembly in any of a series of adjustable positions relative to the to the sled;
   c) the compression fitting imposing compressive forces on different structure than the light pipe.

23. The light pipe fixture of claim 22, wherein the sled is mounted on a pair of rails so as to allow the sled to be positioned as desired along the rails.

24. The light pipe fixture of claim 22, wherein the compression fitting directly compresses against the bayonet assembly.

25. The light pipe fixture of claim 22, wherein the compression fitting compresses against a flexible gooseneck, which, once bent, remains in place; the gooseneck, in turn being connected to a cylindrical sleeve, one end of which sleeve is connected to the bayonet assembly.

26. A light pipe fixture with adjustable light beam spreads, comprising:
   a) a bayonet assembly having a generally tubular coupling for receiving a light-dispensing end of a light pipe; and
   b) a receiver assembly having:
      i) a generally tubular coupling for receiving therewithin the bayonet assembly coupling at adjustable levels of penetration of the bayonet assembly coupling within the receiver assembly coupling;
      ii) an optical lens; and
      iii) a hollow portion for focusing a light beam from the end of the light pipe through the lens;
   c) the bayonet assembly and receiver assembly sharing a main fixture axis;
   d) the radial interior surface of the receiver assembly coupling and the radial exterior surface of the bayonet assembly coupling being so configured that the receiver assembly coupling slidably and lockingly receives the bayonet assembly coupling in any of a plurality of positions along the length of the receiver assembly coupling, so as to allow for different discrete distances between the end of the fiber and the lens;
   e) the radial interior surface of the receiver assembly coupling comprising:
      i) a plurality of axial positioning pads positioned at different points along the length of the receiver assembly coupling; and
      ii) associated circumferential flange stops positioned closer to the lens than the axial positioning pads;
      iii) receiving channels being defined between adjacent axial positioning pads;
   f) the radial exterior surface of the bayonet assembly coupling comprising:
      i) a plurality of axial stop ledges positioned at different points along the length of the bayonet assembly coupling for stopping against the axial positioning pads; and
      ii) a circumferential lock flange for being received in a respective receiving channel to an axial extent delimited by an axial stop ledge abutting against an axial positioning pad;
      iii) the circumferential lock flange and an axially aligned, axial stop ledge of the bayonet assembly defining an axial space therebetween for receiving a positioning pad of the receiver assembly.

27. The light pipe fixture of claim 26, wherein the axial positioning pads and circumferential flange stops of the receiver assembly coupling and the axial positioning pads and circumferential lock flange of the bayonet assembly coupling form a pattern for approximately 180 degrees around the main axis of the respective couplings; the pattern being repeated for another approximately 180 degrees around the main axis of the respective couplings.

28. The light pipe fixture of claim 27, wherein the first set of structures includes only six axial positioning pads arranged to provide for three axial positions of the bayonet assembly coupling relative to the receiver assembly coupling.

29. The light pipe fixture of 28, wherein the bayonet assembly and receiver assembly are configured to provide adjustable light-beam spreads of 15 degrees, 25 degrees or 45 degrees.

30. The light pipe fixture of claim 27, wherein:
a) the receiver assembly coupling includes a radial-bearing region having a radially bearing surface positioned radially closer to the circumferential lock flange than a base surface of the receiver assembly coupling; and
b) the radial positioning pads of the receiver assembly coupling are mounted on the radial-bearing region for making contact in the radial direction with the circumferential lock flange of the bayonet assembly coupling.

31. The light pipe fixture of claim 30, wherein the radial-bearing region is shaped to create an annular shelf that adjoins, and is aligned axially with, an associated axial positioning pad, so as to create a substantially continuous annular surface for axially receiving a respective axial stop ledge in abutting relationship.

32. The light pipe of claim 31, wherein the continuous annular surface supports the entire axial portion of an associated axial stop ledge that faces axially in the direction of the associated positioning pad after a circumferential lock flange is inserted into a respective receiving channel and the first and second sets of structures are rotated relative to each other until a circumferential lock flange circumferentially abuts a circumferential flange stop.

33. The light pipe fixture of claim 26, 27, 28, 30, 31 or 32, further comprising a mounting arrangement for the bayonet assembly and receiver assembly; the mounting arrangement comprising:

a) a sled; and
b) a generally tubular, threaded compression fitting for mounting the bayonet assembly in any of a series of adjustable positions relative to the to the sled;
c) the compression fitting imposing compressive forces on different structure than the light pipe.

34. The light pipe fixture of claim 33, wherein the compression fitting directly compresses against the bayonet assembly.

35. The light pipe fixture of claim 33, wherein the compression fitting compresses against a flexible gooseneck, which, once bent, remains in place; the gooseneck, in turn being connected to a cylindrical sleeve, one end of which sleeve is connected to the bayonet assembly.

36. The light pipe fixture of claim 26, 27, 28, 30, 31 or 32, wherein the receiver assembly accommodates first and second types of beauty rings by comprising:
a) first and second recesses at a light-dispensing end for receiving first and second latches extending radially inwardly from a first type of beauty ring, respectively; the first and second recesses having:
i) a central path that extends axially; and
ii) first and second paths extending in opposite circumferential directions from the central path at respectively different axial positions, for selectively receiving a latch of the first type of beauty ring; and
b) a pair of mounting apertures for respectively receiving a pair of axially extending mounting arms of a second type of beauty ring; the mounting apertures including a mounting ridge radially facing a pair of mounting valleys of an associated mounting arm of the second type of beauty ring for selectively being mounted in one or the other mounting valley.

* * * * *